United States Patent
Madzgalla et al.

(10) Patent No.: US 12,515,633 B2
(45) Date of Patent: Jan. 6, 2026

(54) ELECTROMOTIVE ACTUATOR ASSEMBLY FOR AN ELECTROMECHANICAL VEHICLE BRAKE, AND METHOD FOR ACTIVATING AND DEACTIVATING A PARKING BRAKE FUNCTION

(71) Applicant: ZF Active Safety GmbH, Koblenz (DE)

(72) Inventors: Lukas Madzgalla, Lahnstein (DE); Peter Maeurer, Koblenz (DE); Guido Zenzen, Macken (DE); Marco Becker, Oberduerenbach (DE)

(73) Assignee: ZF Active Safety GmbH, Koblenz (DE)

( * ) Notice: Subject to any disclaimer, the term of this patent is extended or adjusted under 35 U.S.C. 154(b) by 396 days.

(21) Appl. No.: 18/172,045

(22) Filed: Feb. 21, 2023

(65) Prior Publication Data

US 2023/0264670 A1 Aug. 24, 2023

(30) Foreign Application Priority Data

Feb. 21, 2022 (DE) .......................... 102022103978.1

(51) Int. Cl.
*F16D 51/46* (2006.01)
*B60T 1/00* (2006.01)
(Continued)

(52) U.S. Cl.
CPC ............ *B60T 13/746* (2013.01); *B60T 1/005* (2013.01); *F16D 65/18* (2013.01); *F16D 55/226* (2013.01);
(Continued)

(58) Field of Classification Search
CPC ........ B60T 13/746; B60T 1/005; F16D 65/18; F16D 55/226; F16D 41/12; F16D 51/46;
(Continued)

(56) References Cited

U.S. PATENT DOCUMENTS

| 4,538,825 A * | 9/1985 | Delahoussaye .......... A61G 5/10 188/82.84 |
| 5,090,517 A * | 2/1992 | Doughty .................. B62B 5/04 188/29 |

(Continued)

FOREIGN PATENT DOCUMENTS

| DE | 147148 C | 5/1903 |
| DE | 102019207793 A1 | 7/2020 |
| WO | WO-2020158587 A1 * | 8/2020 .............. B60T 1/005 |

*Primary Examiner* — Thomas W Irvin
(74) *Attorney, Agent, or Firm* — Kristin L. Murphy

(57) ABSTRACT

An electromotive actuator assembly for an electromechanical vehicle brake is disclosed having a transmission that comprises transmission shafts, cylindrical brake surface provided in the transmission and which encircles an axis of rotation, and a blocking element mounted eccentrically with respect to the axis of rotation. The blocking element is adjustable about a pivot axis by a drive unit and can be placed in contact with the cylindrical brake surface. The blocking element is arranged so as to become wedged together with the cylindrical brake surface with self-locking action in only one direction of rotation of the cylindrical brake surface about the axis of rotation (A). The disclosure also relates to a method for activating and deactivating a parking brake function.

13 Claims, 3 Drawing Sheets

(51) Int. Cl.
  *B60T 13/74* (2006.01)
  *F16D 65/18* (2006.01)
  *F16D 55/226* (2006.01)
  *F16D 121/20* (2012.01)
  *F16D 121/24* (2012.01)
  *F16D 125/40* (2012.01)
  *F16D 125/48* (2012.01)

(52) U.S. Cl.
  CPC ...... *F16D 2121/20* (2013.01); *F16D 2121/24* (2013.01); *F16D 2125/40* (2013.01); *F16D 2125/48* (2013.01)

(58) Field of Classification Search
  CPC .......... F16D 51/60; F16D 51/62; F16D 49/00; F16D 2121/20; F16D 2121/24; F16D 2125/40; F16D 2125/48
  USPC ................................ 188/74, 342, 82.1, 82.7
  See application file for complete search history.

(56) References Cited

U.S. PATENT DOCUMENTS

| | | | | |
|---|---|---|---|---|
| 7,124,858 | B2 * | 10/2006 | Ikegami | A61G 5/1035 |
| | | | | 280/250.1 |
| 7,673,949 | B2 * | 3/2010 | Kuramochi | B60T 8/885 |
| | | | | 303/122.03 |
| 7,815,019 | B2 * | 10/2010 | Chen | B62B 9/087 |
| | | | | 188/328 |
| 10,458,498 | B2 * | 10/2019 | Sala | F16D 65/18 |
| 10,668,912 | B2 * | 6/2020 | Kirchner | B60T 1/005 |
| 11,932,214 | B2 * | 3/2024 | Baek | F16D 55/227 |
| 12,115,957 | B2 * | 10/2024 | Goto | B60T 13/741 |
| 12,158,187 | B2 * | 12/2024 | Kang | B60T 1/005 |
| 2004/0144600 | A1 * | 7/2004 | Ikegami | F16D 51/20 |
| | | | | 188/2 F |
| 2006/0163939 | A1 * | 7/2006 | Kuramochi | B60T 8/885 |
| | | | | 303/122.04 |
| 2018/0135710 | A1 * | 5/2018 | Sala | B60T 13/741 |
| 2022/0024426 | A1 * | 1/2022 | Baek | F16D 65/18 |
| 2022/0144237 | A1 * | 5/2022 | Goto | B60T 7/042 |
| 2024/0336238 | A1 * | 10/2024 | Hyeon | F16D 65/183 |
| 2025/0035176 | A1 * | 1/2025 | Seibert | F16D 63/006 |
| 2025/0035177 | A1 * | 1/2025 | Schwegler | F16D 63/006 |

* cited by examiner

ELECTROMOTIVE ACTUATOR ASSEMBLY FOR AN ELECTROMECHANICAL VEHICLE BRAKE, AND METHOD FOR ACTIVATING AND DEACTIVATING A PARKING BRAKE FUNCTION

CROSS-REFERENCE TO RELATED APPLICATION

This application claims priority to German Priority Application No. 102022103978.1, filed Feb. 21, 2022, the disclosure of which is incorporated herein by reference in its entirety.

TECHNICAL FIELD

The disclosure relates to an electromotive actuator assembly for an electromechanical vehicle brake, and to a method for activating and deactivating a parking brake function.

BACKGROUND

Electromechanical vehicle brakes typically comprise an electric motor, a transmission and a spindle drive. If it is sought to impart a braking action, the spindle drive is actuated by the electric motor via the transmission such that a clamping force is exerted by the brake pads on the brake disc of the vehicle brake.

It is common for electromechanical vehicle brakes, that is to say service brakes, to be of self-releasing design, such that, when the supply of electrical current is withdrawn or in the event of an electrical failure, the clamping force is automatically eliminated, and no braking action is present.

By contrast, for the parking brake, it is essential that a clamping force and thus a braking action is maintained by the electromechanical vehicle brake, such that the vehicle is reliably held at a standstill, even when the supply of electrical current is withdrawn or in the event of an electrical failure.

To achieve this, the existing prior art has disclosed solutions in which, as soon as the desired clamping force for establishing the parking brake function has been attained, a release of the parking brake is prevented by a pawl and a toothed gear in the transmission of the electromechanical vehicle brake. For this purpose, the pawl engages with the toothing of the toothed gear, such that the toothed gear, and thus also the transmission or the spindle drive, cannot rotate. This blocking function by the pawl is maintained even when the electromechanical vehicle brake is not electrically energized.

A disadvantage here is the risk of the teeth of toothed gear and pawl making tip-to-tip contact, and of the pawl therefore not immediately engaging with the toothed gear. Furthermore, the outlay on production and manufacturing is increased, because it is normally necessary for an additional toothed gear, which interacts with the pawl, to be provided in the transmission. Furthermore, abrupt step changes in force occur upon the engagement and disengagement of the pawl, resulting in wear.

SUMMARY

Against this background, what is needed is to provide an electromotive actuator assembly for an electromechanical vehicle brake, which actuator assembly operates with the least possible wear and, using few components, can be easily integrated in space-saving fashion into a vehicle brake.

An electromotive actuator assembly for an electromechanical vehicle brake is disclosed, the brake having a transmission that comprises transmission shafts, having a circular cylindrical brake surface which is provided in the transmission and which encircles an axis of rotation, and having a blocking element which is mounted eccentrically with respect to the axis of rotation and which is adjustable about a pivot axis by a drive unit and which can be placed in contact with the cylindrical brake surface, the blocking element being arranged so as to become wedged together with the circular cylindrical brake surface with self-locking action in only one direction of rotation of the circular cylindrical brake surface about the axis of rotation.

It is the underlying concept of the disclosure to use the blocking element that is placed in contact with the cylindrical brake surface to block that direction of rotation of the transmission which would result in an elimination of the braking action in a parked situation. By virtue of the fact that the blocking element is mounted eccentrically with respect to the axis of rotation, said blocking element, when in the wedged state, has a self-locking action based on friction, whereby the braking action is maintained by the blocking element even if the supply of electrical current is withdrawn or in the event of an electrical failure. The blocking element, when it has been placed in contact and wedged together with the brake surface, can thus be released only by active intervention when it is sought to release the brake.

The pawl itself has the advantage of being of simple and robust construction.

According to one exemplary aspect of the disclosure, the circular cylindrical brake surface may be provided on a toothed gear or on a transmission shaft or on a component provided specifically for forming the brake surface.

If the brake surface is provided on a toothed gear, no further component is required, and it is merely necessary for the toothed gear itself to be adapted. Furthermore, the diameter of the brake surface can be set to be at least approximately equal to the diameter of the toothed gear, such that a high torque can be imparted by the blocking element with relatively little force.

It is particularly advantageous if the circular cylindrical brake surface is formed on a transmission shaft, because no further complex modifications are necessary and it is merely necessary to provide a region on the shaft for the brake surface.

By a component provided specifically for forming the brake surface, the dimensions, surface and material of the brake surface can be individually selected and adapted to the requirements.

In one exemplary arrangement, a toothed gear of the transmission may advantageously have a hollow cylindrical region, the inner lateral surface of which forms the brake surface. In such a case, the toothed gear is thus of pot-shaped form, and is merely a sleeve in the region of the brake surface. Here, the blocking element can interact with the inner lateral surface.

The blocking element and the pivot axis thereof may be arranged within the hollow cylindrical region. In other words, the entire blocking element is received spatially within the hollow cylindrical region of the toothed gear, such that this arrangement can be implemented in particularly space-saving form.

Alternatively, the circular cylindrical brake surface may be provided on an outer contour of a rotating component of the transmission, for example of a toothed gear. It is conceivable here for the axis of rotation to be situated within or outside the outer contour of the rotating component as viewed axially.

The drive unit may be a bistable magnetic actuator which is switchable in two directions between two end positions and which is situated fixedly in both end positions when electrically deenergized, and/or may be a monostable magnetic actuator which is switchable in one direction and which is adjustable in the other direction by a spring element.

If the drive unit is configured as a bistable magnetic actuator, the blocking element can be actively adjusted in both directions about the pivot axis by virtue of the magnetic actuator being correspondingly electrically energized.

If the drive unit is configured as a monostable magnetic actuator with spring element, the spring element acts on the blocking element about the pivot axis in the direction in which the blocking element is placed in contact with the brake surface. It is thus ensured by the spring element that that direction of rotation of the transmission which would result in an elimination of the braking action in a parked situation if the supply of electrical current is withdrawn, or in the event of an electrical failure, is blocked. In order to unblock the direction of rotation, it is necessary to electrically energize the monostable magnetic actuator, which adjusts the blocking element away from the brake surface such that the direction of rotation for releasing the brake is unblocked.

Alternatively, the drive unit may be an electric motor with a transmission and/or with a spindle drive. Such an actuator has the advantage that it is possible to set the force with which the blocking element is adjusted toward the brake surface.

The blocking element may be composed of metal and/or of a plastic.

If the blocking element is composed of metal, it is particularly suitable for high loads and is not sensitive to wear.

If the blocking element is composed of a plastic, it can be produced particularly easily, and production costs are lowered.

If the blocking element is produced from a composite of metal and plastic, it is conceivable for those regions of the blocking element which are subject to particularly high load to be provided with metal. Those regions of the blocking element which are in contact with the brake surface are particularly suitable for this. Furthermore, the region of the blocking element in the vicinity of the pivot axis could also be reinforced with metal.

The blocking element may have a pressure-exerting surface which bears against the brake surface and which is of complementary design with respect to the brake surface and which bears areally against the brake surface in the self-locking state. In this way, any forces that arise are introduced areally from the brake surface into the blocking element, such that the material loading is uniform and no force peaks occur.

A method for activating and deactivating a parking brake function, with an actuator assembly according to the is also disclosed, the method having the following steps:
 a) detecting a parking braking command;
 b) generating a clamping force between a brake disc and brake pads by rotating the transmission in an immobilizing direction of rotation;
 c) when a defined clamping force is attained, introducing the self-locking blocking element by the drive unit, such that the blocking element is in contact with the brake surface;
 d) rotating the transmission counter to the immobilizing direction of rotation, and wedging the blocking element against the brake surface such that a further rotation counter to the immobilizing direction of rotation is blocked;
 e) detecting a demand for releasing the parking brake;
 f) rotating the transmission in the immobilizing direction of rotation and simultaneously releasing the contact between the blocking element and the brake surface by the drive unit; and
 g) rotating the transmission counter to the immobilizing direction of rotation, and eliminating the clamping force between the brake pads and the brake disc.

As a result of the transmission being rotated counter to the immobilizing direction of rotation in step d), the blocking element is actively wedged against the brake surface, such that a further rotation counter to the immobilizing direction of rotation, and thus a reduction of the damping force between the brake disc and the brake pads, is blocked.

As a result of the transmission being rotated in the immobilizing direction of rotation in step f), the wedging of the blocking element that has been generated in step d) is released again, and said blocking element is moved away from the brake surface by the drive unit by way of a simultaneous pushing action, such that there is no longer contact between the blocking element and the brake surface.

Furthermore, with regard to further advantages that result from this, reference is made to the explanations above.

BRIEF DESCRIPTION OF DRAWINGS

The disclosure will be described below on the basis of an exemplary arrangement that is illustrated in the appended drawings. In the drawings.

DETAILED DESCRIPTION

Figure 1:
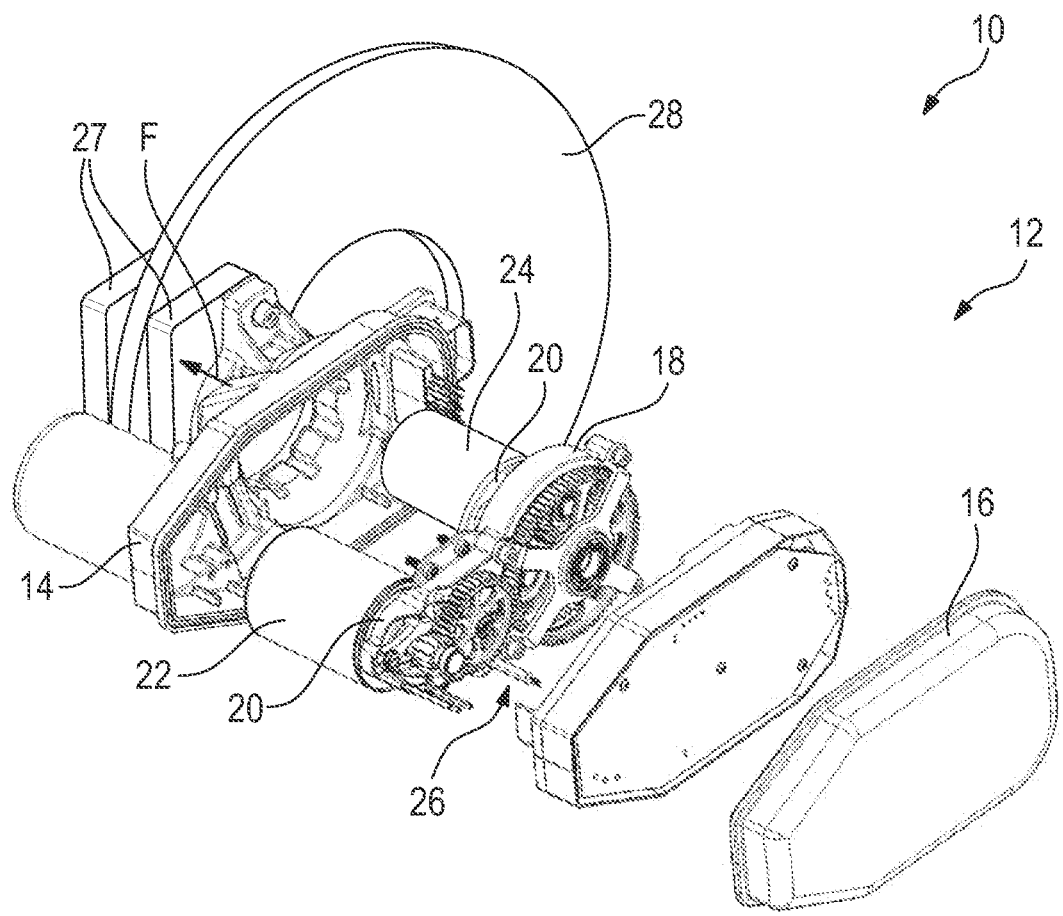
FIG. 1 shows an actuator assembly according to the disclosure, which can be operated by way of a method according to the disclosure, in a perspective exploded illustration.

FIG. 1 shows an electromotive actuator assembly 10 for an electromechanical vehicle brake.

The actuator assembly 10 is arranged in a housing 12.

The housing 12 comprises a substantially shell-like housing base part 14 and a housing cover 16, by which the housing base part 14 is sealingly closed in the assembled state.

The actuator assembly 10 received therein comprises a carrier assembly 18 with fastening interfaces 20.

An electric motor 22 and a spindle drive 24 are fastened to the fastening interfaces 20. The electric motor 22 is mechanically connected to the spindle drive 24 via a transmission 26 that is received in the carrier assembly 18, such that the spindle drive 24 can be adjusted by the electric motor 22 via the transmission 26.

The spindle drive 24 is configured to generate a clamping force F by which brake pads 27 are forced against a brake disc 28, such that a braking action arises.

Figures 2, 3:
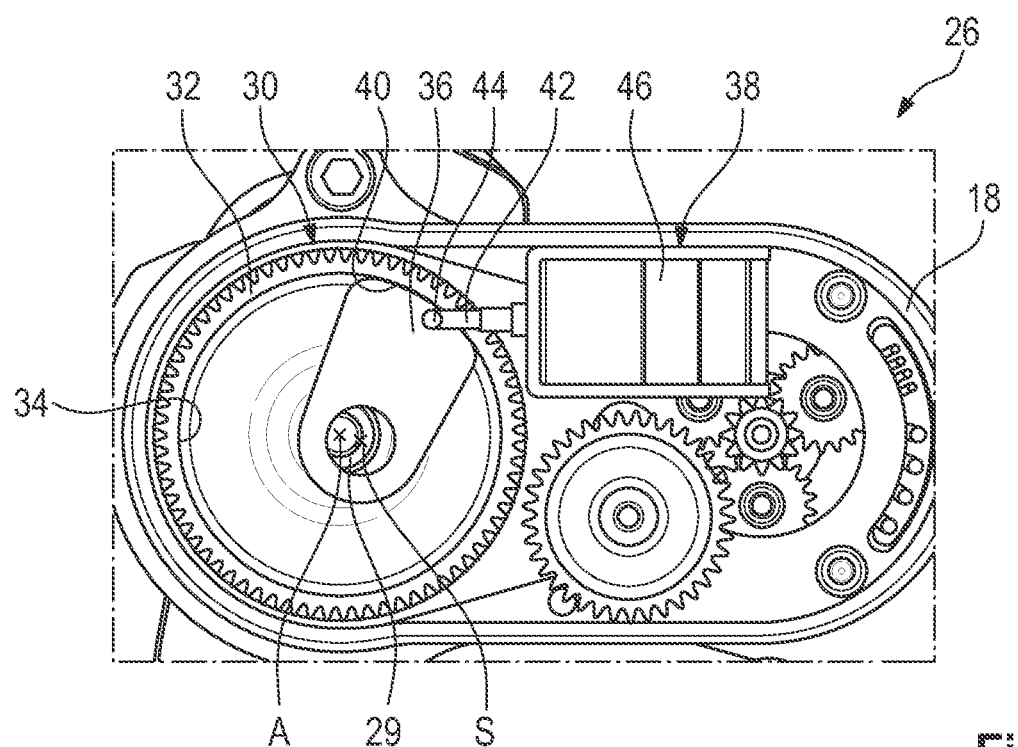
FIG. 2 shows a part of a transmission that is situated in the actuator assembly according to the disclosure, with a blocking element according to a first option.
FIG. 3 shows a part of a transmission that is situated in the actuator assembly according to the disclosure, with a blocking element according to a second option.

FIG. 2 shows the carrier assembly 18 with the transmission 26 received therein, in a detail view.

The transmission 26 comprises a toothed gear 30 arranged on a transmission shaft 29. The transmission shaft 29 and the toothed gear 30 have a common axis of rotation A. The transmission shaft 29 forms the output to the spindle drive 24, whereas the electric motor 22, by way of its pinion 31, constitutes the drive input.

The toothed gear 30 has a hollow cylindrical region 32, whereby the toothed gear 30 has a pot shape, a circular cylindrical brake surface 34 that encircles the axis of rotation A being provided on the inner lateral surface of the hollow cylindrical region 32.

A blocking element 36 is arranged within the hollow cylindrical region 32 of the toothed gear 30.

The blocking element 36 is a lever which is mounted, eccentrically with respect to the axis of rotation A, so as to be movable about its own pivot axis S. Here, a drive unit 38 that is coupled to the blocking element 36, allows the blocking element 36 to be adjusted about the pivot axis S and come into contact with the cylindrical brake surface by way of a pressure-exerting surface 40 which is present on the outside of the blocking element 36 and which is of complementary design with respect to the brake surface 34.

The drive unit 38 is coupled via a stroke-imparting rod 42 and a bearing 44 (for example a slot) to the blocking element 36. Furthermore, the drive unit 38 has a bistable magnetic actuator 46, which is actively switchable in two directions.

Figure 4:
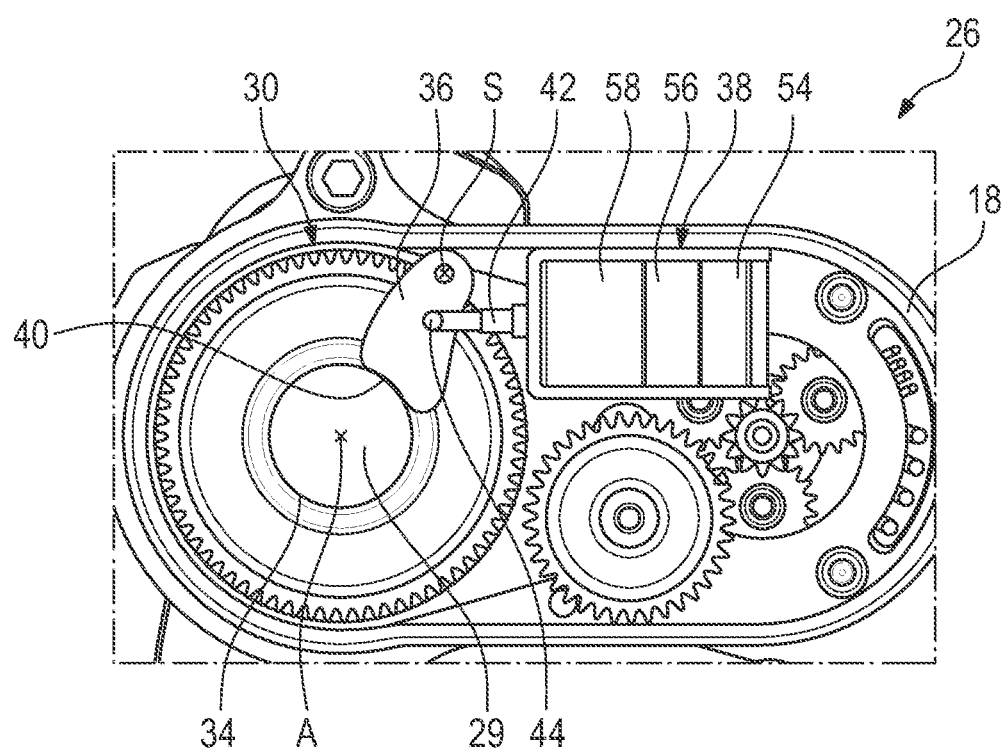
FIG. 4 shows a part of a transmission that is situated in the actuator assembly according to the disclosure, with a blocking element according to a third option.

FIGS. 3 and 4 show further alternatives for the blocking element 36.

By contrast to the blocking element 36 shown in FIG. 2, the blocking element 36 in FIG. 3 engages with an outer contour 47 of a rotating component of the transmission 26. Said outer contour 47 may be provided on the toothed gear 30. It is however also possible for the brake surface 34 to be formed by a component 48 provided specifically for the purpose.

A further difference is that the drive unit 38 is designed in accordance with a second option. This comprises a monostable magnetic actuator 50 with a spring element 52, which is configured as a tension or compression spring, for the purposes of adjusting the blocking element 36.

FIG. 4 shows a third alternative for the blocking element 36 and the brake surface 34. In this case, the blocking element 36 acts on the outer contour of the transmission shaft 29.

Furthermore, the drive unit 38 is designed in accordance with a third option, which comprises an electric motor 54 with a transmission 56. In addition to the transmission 56 or instead of the transmission 56, it is also possible to use a spindle drive 58 in the drive unit 38 (only schematically shown in FIG. 4).

The drive units 38 shown in the respective figures are not to be understood as being utilized exclusively for the alternatives shown in the figures, but are to be understood as being usable individually in any of these alternatives as required.

Here, the blocking element 36 may be manufactured from metal. It is however also conceivable for said blocking element to be manufactured from a plastic or from a two-component part composed of metal and plastic.

The method for activating and deactivating a parking brake function with an actuator assembly according to the statements above will be discussed below with reference to FIGS. 2 to 4.

Here, in the initial situation, there is no contact between the blocking element 36 and the circular cylindrical brake surface 34.

Detection of a parking braking command is performed in the first step. Said parking braking command may, for example, be detected by an integrated controller (not shown in the figures) and transmitted to the electromotive actuator assembly 10. It is also conceivable here for the vehicle-integrated controller to be arranged within the housing 12 of the actuator assembly 10.

In the next step, by rotation of the transmission 26 in an immobilizing direction of rotation, or more specifically by rotation of the toothed gear 30 anticlockwise, a clamping force F is generated between the brake disc 28 and the brake pads 27. This causes a braking action to be built up, which increases in a manner dependent on the increasing clamping force F.

When a defined clamping force F that generates a braking action sufficient to hold the vehicle at a standstill has been attained, the self-locking blocking element 36 is moved clockwise about the pivot axis S, and placed in contact with the brake surface 34 such that the pressure-exerting surface 40 of the blocking element 36 bears areally against the brake surface 34, by the drive unit 38 via the stroke-imparting rod 42. As the blocking element 36 is advanced, the transmission 26 does not rotate and is thus at a standstill.

In the case of the drive unit 38 according to the first option, the bistable magnetic actuator 46 is actively switched in order to advance the blocking element 36. According to the second option, the blocking element 36 is advanced by the spring element 52, and according to the third option, the blocking element 36 is advanced by the electric motor 54, which adjusts the blocking element 36 via the transmission 56 and/or the spindle drive 58.

In the next step, the transmission 26 is rotated counter to the immobilizing direction of rotation. This causes the toothed gear 30, and thus also all of the components arranged with the transmission shaft 29, to rotate clockwise to a minimal degree. This has the result that the blocking element 36 wedges against the brake surface 34, such that a further rotation counter to the immobilizing direction of rotation is blocked. Here, only a small rotation of the transmission 26 is necessary in order to cause wedging of the blocking element 36. The parking brake function is thus activated. Here, the blocking element 36 blocks any rotation of the transmission 26 counter to the immobilizing direction of rotation, which would result in a reduction of the clamping force F between the brake disc 28 and the brake pads 27, such that the braking action is reliably maintained.

If the actuator assembly 10 or a vehicle-integrated controller detects the command to release the parking brake, a deactivation of the parking brake function is performed.

Here, the transmission 26 is rotated in the immobilizing direction of rotation, and the toothed gear 30 is thus rotated anticlockwise. At the same time, the drive unit 38 applies a force in order to move the blocking element 36 anticlockwise about the pivot axis S, such that the pressure-exerting surface 40 is no longer in contact with the brake surface 34. The rotation in the immobilizing direction of rotation causes a small movement of the blocking element 36 about the pivot axis S. As a result, the forces acting between blocking element 36 and brake surface 34 decrease to such an extent that the wedging of the components is eliminated, and the blocking element 36 moves away from the brake surface 34 owing to the simultaneous adjustment by the drive unit 38.

Here, too, the adjustment may be performed by a drive unit 38 as described in the options above.

When there is no longer contact between the blocking element 36 and the brake surface 34, the transmission 26 can thus again be rotated freely counter to the immobilizing direction of rotation. Here, the clamping force F between the brake pads 27 and the brake disc 28 is eliminated, and the braking action steadily decreases, such that the parking brake function is fully deactivated.

The invention claimed is:

1. An electromotive actuator assembly for an electromechanical vehicle brake, comprising:
   a transmission having transmission shafts,
   a cylindrical brake surface which is provided in the transmission and which encircles an axis of rotation, and
   a blocking element which is mounted eccentrically with respect to the axis of rotation and which is adjustable about a pivot axis by means of a drive unit and which can be placed in contact with the cylindrical brake surface,
   wherein the blocking element is arranged so as to become wedged together with the cylindrical brake surface with self-locking action in only one direction of rotation of the cylindrical brake surface about the axis of rotation, and
   wherein a toothed gear of the transmission has a hollow cylindrical region, an inner lateral surface of which forms the brake surface.

2. The actuator assembly according to claim 1, wherein the cylindrical brake surface is provided on the toothed gear.

3. The actuator assembly according to claim 2, wherein the cylindrical brake surface is provided on an outer contour of a rotating component of the transmission.

4. The actuator assembly according to claim 1, wherein the blocking element and the pivot axis thereof are arranged within the hollow cylindrical region.

5. The actuator assembly according to claim 1, wherein the cylindrical brake surface is provided on an outer contour of a rotating component of the transmission.

6. The actuator assembly according to claim 1, wherein the blocking element is composed of metal and/or of a plastic.

7. The actuator assembly according to claim 1, wherein the blocking element has a pressure-exerting surface which can bear against the brake surface and which is of complementary design with respect to the brake surface and which bears areally against the brake surface in the self-locking state.

8. The actuator assembly according to claim 1, wherein the cylindrical brake surface is provided on a transmission shaft.

9. The actuator assembly according to claim 1, wherein the cylindrical brake surface is provided on a component provided for forming the brake surface.

10. The actuator assembly according to claim 1, wherein the drive unit is a monostable magnetic actuator which is switchable in one direction and which is adjustable in the other direction by a spring element.

11. A method for activating and deactivating a parking brake function, with an actuator assembly according to claim 1, the method, having the following steps:
   a) detecting a parking braking command;
   b) generating a clamping force between a brake disc and brake pads by rotating the transmission in an immobilizing direction of rotation;
   c) when a defined clamping force is attained, introducing the self-locking blocking element the drive unit, such that the blocking element is in contact with the brake surface;
   d) rotating the transmission counter to the immobilizing direction of rotation, and wedging the blocking element against the brake surface such that a further rotation counter to the immobilizing direction of rotation is blocked;
   e) detecting a demand for releasing the parking brake;
   f) rotating the transmission in the immobilizing direction of rotation and simultaneously releasing the contact between the blocking element and the brake surface the drive unit; and
   g) rotating the transmission counter to the immobilizing direction of rotation, and eliminating the clamping force between the brake pads and the brake disc.

12. An electromotive actuator assembly for an electromechanical vehicle brake, comprising:
   a transmission having transmission shafts,
   a cylindrical brake surface which is provided in the transmission and which encircles an axis of rotation, and
   a blocking element which is mounted eccentrically with respect to the axis of rotation and which is adjustable about a pivot axis by means of a drive unit and which can be placed in contact with the cylindrical brake surface,
   wherein the blocking element is arranged so as to become wedged together with the cylindrical brake surface with self-locking action in only one direction of rotation of the cylindrical brake surface about the axis of rotation; and
   wherein the drive unit is an electric motor with a transmission and/or with a spindle drive.

13. An electromotive actuator assembly for an electromechanical vehicle brake, comprising:
   a transmission having transmission shafts,
   a cylindrical brake surface which is provided in the transmission and which encircles an axis of rotation, and
   a blocking element which is mounted eccentrically with respect to the axis of rotation and which is adjustable about a pivot axis by means of a drive unit and which can be placed in contact with the cylindrical brake surface,
   wherein the blocking element is arranged so as to become wedged together with the cylindrical brake surface with self-locking action in only one direction of rotation of the cylindrical brake surface about the axis of rotation, and
   wherein the drive unit is a bistable magnetic actuator which is switchable in two directions between two end positions and which is situated fixedly in both end positions when electrically deenergized.

* * * * *